(12) United States Patent
Su et al.

(10) Patent No.: US 12,321,537 B1
(45) Date of Patent: Jun. 3, 2025

(54) MOUSE DEVICE

(71) Applicant: Primax Electronics Ltd., Taipei (TW)

(72) Inventors: Chun-Nan Su, Taipei (TW); Chun-Che Wu, Taipei (TW); Sheng-An Tsai, Taipei (TW); Shu-An Huang, Taipei (TW); Li-Kuei Cheng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/584,277

(22) Filed: Feb. 22, 2024

(30) Foreign Application Priority Data

Jan. 12, 2024 (CN) .......................... 202410050378.6

(51) Int. Cl.
*G06F 3/0354* (2013.01)
*G06F 3/0362* (2013.01)

(52) U.S. Cl.
CPC ........ *G06F 3/03543* (2013.01); *G06F 3/0362* (2013.01)

(58) Field of Classification Search
CPC ............................ G06F 3/03543; G06F 3/0361
USPC .......................................................... 345/163
See application file for complete search history.

(56) References Cited

U.S. PATENT DOCUMENTS

| 11,797,108 B1* | 10/2023 | Su ........................ G06F 3/03543 |
| 2007/0188453 A1* | 8/2007 | O'Sullivan ......... G06F 3/03543 |
| | | 345/163 |

* cited by examiner

*Primary Examiner* — Abdul-Samad A Adediran
(74) *Attorney, Agent, or Firm* — KIRTON McCONKIE; Evan R. Witt (57) ABSTRACT

A mouse device includes a casing and a roller module. The roller module is disposed within the casing. The roller module includes a scroll wheel, a supporting seat, a magnetic ratchet and a permanent magnet. The supporting seat includes a first support part and a second support part. The magnetic ratchet is arranged between the scroll wheel and the first support part of the supporting seat. As the scroll wheel is rotated, the magnetic ratchet is correspondingly rotated. The magnetic ratchet includes plural tooth structures. The permanent magnet is installed on the first support part of the supporting seat. The permanent magnet is aligned with one of the plural tooth structures of the magnetic ratchet. While the magnetic ratchet is rotated with the scroll wheel, a magnetic attractive force between the plural tooth structures and the at least one permanent magnet is generated.

17 Claims, 8 Drawing Sheets

MOUSE DEVICE

FIELD OF THE INVENTION

The present invention relates to an input device, and more particularly to a mouse device with a roller module.

BACKGROUND OF THE INVENTION

A mouse is used to control a cursor on a computer screen in order to operate the computer. Since 1968, the United States has produced the world's first mouse. After then, the mouse is applied to word processing operations, video games, industrial drawings, drawing design or media production. Consequently, the mouse has become an indispensable part of the computer system. In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-key mouse device is gradually evolved into the modern wireless multi-key roller mouse device. For complying with different industrial needs or personal preferences, various electronic manufacturers have begun to create a variety of mouse device devices with different shapes in order to meet the operation requirements of different users. Consequently, people pay much attention to the comfort and sensitivity of operating the mouse button (e.g., a left button, a right button or a scroll wheel).

According to the existing design, the scroll wheel of the mouse can be rotated forwardly or backwardly, and the scroll wheel of the mouse can be pressed to trigger a switch. When the scroll wheel of the mouse is rotated forwardly or backwardly by the user, an encoder is correspondingly rotated to result in the stepped motion feel. Consequently, the function of controlling the page scrolling action of a window operation interface can be achieved. However, the scroll wheel cannot be rotated at a fast speed.

For solving the above drawbacks, a mouse with both of the function of generating the stepped motion feel upon rotation of the scroll wheel and the function of quickly rotating the scroll wheel has been introduced into the market. However, it is necessary to additionally install a motor to drive and control the rotating speed of the scroll wheel. In other words, the fabricating cost of the mouse is largely increased.

Therefore, there is a need of providing an improved mouse device in order to overcome the drawbacks of the conventional technologies.

SUMMARY OF THE INVENTION

An object of the present invention provides a mouse device with a roller module. In the roller module, a magnetic ratchet and at least one permanent magnet cooperate with each other to achieve both of the function of generating the stepped motion feel upon rotation of the scroll wheel and the function of quickly rotating the scroll wheel.

The other objects and advantages of the present invention will be understood from the disclosed technical features.

In accordance with an aspect of the present invention, a mouse device is provided. The mouse device includes a casing and a roller module. The roller module is disposed within the casing. The roller module includes a scroll wheel, a supporting seat, a magnetic ratchet and at least one permanent magnet. The supporting seat is used for supporting the scroll wheel. The supporting seat includes a first support part and a second support part, which are opposed to each other. The scroll wheel is pivotally coupled between the first support part and the second support part. Consequently, the scroll wheel is rotatable relative to the supporting seat. The magnetic ratchet is arranged between the scroll wheel and the first support part of the supporting seat. As the scroll wheel is rotated, the magnetic ratchet is correspondingly rotated. The magnetic ratchet includes plural tooth structures. The plural tooth structures are discretely arranged on the magnetic ratchet. The at least one permanent magnet is installed on the first support part of the supporting seat. In addition, at least one permanent magnet is aligned with at least one of the plural tooth structures of the magnetic ratchet. There is a distance between each of the at least one permanent magnet and the corresponding tooth structure of the plural tooth structures. While the magnetic ratchet is rotated with the scroll wheel, a magnetic attractive force between the plural tooth structures and the at least one permanent magnet is generated.

In an embodiment, the distance between each of the at least one permanent magnet and the corresponding tooth structure of the plural tooth structures is in a range between 0.05 mm and 1.5 mm.

In an embodiment, the supporting seat further includes at least one receiving structure, and the at least one receiving structure is formed in first support part of the supporting seat. Each of the at least one permanent magnet is disposed within the corresponding receiving structure and partially exposed outside the corresponding receiving structure.

In an embodiment, the at least one permanent magnet includes plural permanent magnets. The plural permanent magnets includes a first permanent magnet and a second permanent magnet. The supporting seat further includes a first receiving structure and a second receiving structure. The first receiving structure and the second receiving structure are formed in first support part of the supporting seat. The first permanent magnet is disposed within the first receiving structure and partially exposed outside the first receiving structure. The second permanent magnet is disposed within the second receiving structure and partially exposed outside the second receiving structure. The first permanent magnet is aligned with one of the plural tooth structures of the magnetic ratchet. The second permanent magnet is aligned with another of the plural tooth structures of the magnetic ratchet.

In an embodiment, the first receiving structure is arranged along a first radial direction of the magnetic ratchet, and the second receiving structure is arranged along a second radial direction of the magnetic ratchet. Moreover, an included angle between the first radial direction and the second radial direction is in a range between 45 degrees and 180 degrees.

In an embodiment, the at least one permanent magnet includes plural permanent magnets, and first and second portions of the plural permanent magnets are respectively arranged as a first Halbach array and as a second Halbach array. The supporting seat further includes a first receiving structure and a second receiving structure. The first receiving structure and the second receiving structure are formed in first support part of the supporting seat. The first Halbach array is disposed within the first receiving structure and partially exposed outside the first receiving structure. The second Halbach array is disposed within the second receiving structure and partially exposed outside the second receiving structure. The first Halbach array is aligned with one of the plural tooth structures of the magnetic ratchet. The second Halbach array is aligned with another of the plural tooth structures of the magnetic ratchet.

In an embodiment, the at least one permanent magnet includes plural permanent magnets, and the supporting seat further includes a plural receiving structures. The plural receiving structures are formed in first support part of the supporting seat. The plural permanent magnets are respectively disposed within the corresponding receiving structures. The plural receiving structures are respectively located along different radial directions of the magnetic ratchet and in a radial arrangement.

In an embodiment, the casing includes an upper cover and a base member, and the upper cover and the base member are assembled with each other. An accommodation space is defined between the upper cover and the base member. The roller module is installed on the base member of the casing and disposed within the accommodation space.

In an embodiment, the scroll wheel further includes a rotation shaft. The magnetic ratchet is installed on the rotation shaft. The plural tooth structures of the magnetic ratchet are arranged around the rotation shaft. The scroll wheel is pivotally coupled between the first support part and the second support part of the supporting seat through the rotation shaft. Consequently, the scroll wheel is rotatable relative to the supporting seat and the magnetic ratchet is rotated with the scroll wheel.

In an embodiment, the magnetic ratchet is made of iron, cobalt, nickel or a metallic material with magnetic properties.

From the above descriptions, the present invention provides the mouse device. In the roller module of the mouse device, one or plural permanent magnets and the cooperate with each other to achieve the purpose of the present invention. As a consequence, the mouse device has both of the function of generating the stepped motion feel upon rotation of the scroll wheel and the function of quickly rotating the scroll wheel. When the scroll wheel of the roller module is rotated by the user, the magnetic ratchet is correspondingly rotated with the scroll wheel. Consequently, the plural spaced tooth structures of the magnetic ratchet are sequentially transferred through the region beside the permanent magnet. When any of the plural tooth structures is moved to the region beside the permanent magnet, the magnetic attractive force between this tooth structure and the permanent magnet is generated. Consequently, during the rotation of the scroll wheel, a stepped motion feel like magnetic levitation (i.e., continuous attraction and release) will be generated. In addition, a proper distance between the permanent magnet and each of the plural tooth structures of the magnetic ratchet is maintained. That is, while the magnetic ratchet is rotated with the scroll wheel, the plural tooth structures of the magnetic ratchet and the permanent magnet are not interfered with each other. Due to this structural design, the roller module provides the operating feel of fast rotation (e.g., like a hyper-fast scrolling feel) when the scroll wheel is rotated at a fast speed. Moreover, the structure design of the roller module in the mouse device of the present invention is simplified. It is not necessary to additionally install a motor to drive and control the rotating speed of the scroll wheel. Consequently, the fabricating cost of the mouse device is largely reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. The direction terms mentioned in the present invention, such as "upper", "lower", "inner", "outer", "side", etc., are only the directions for referring to the attached drawings. Therefore, the directional terms are used to describe and understand the present invention, not to limit the present invention.

Figure 1:
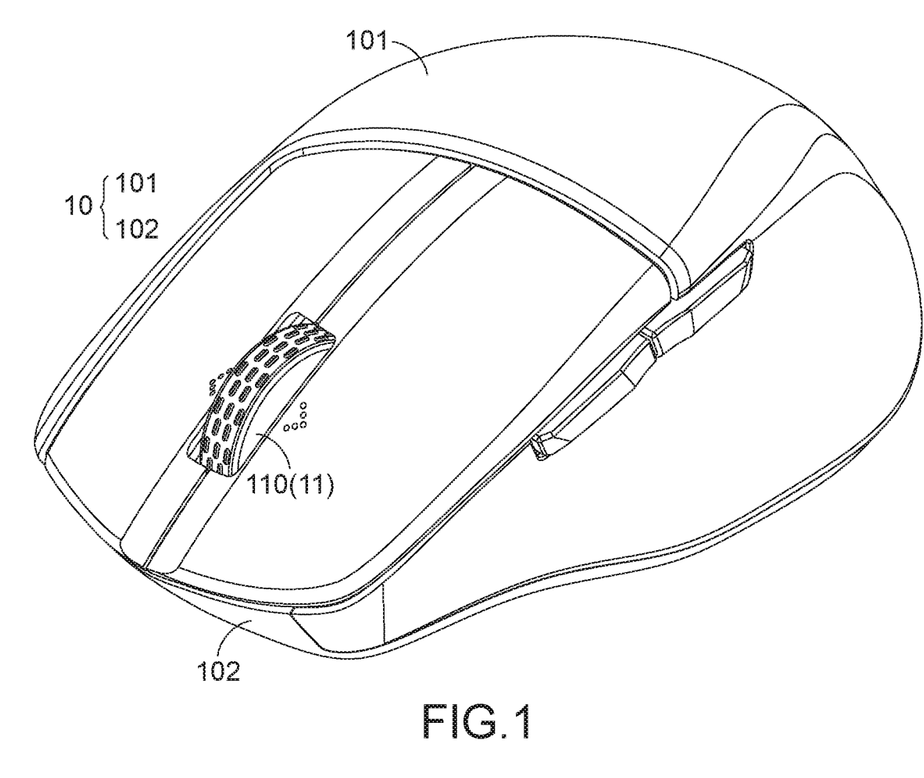
FIG. 1 is a schematic perspective view illustrating the appearance of a mouse device according to a first embodiment of the present invention.
Figure 2:
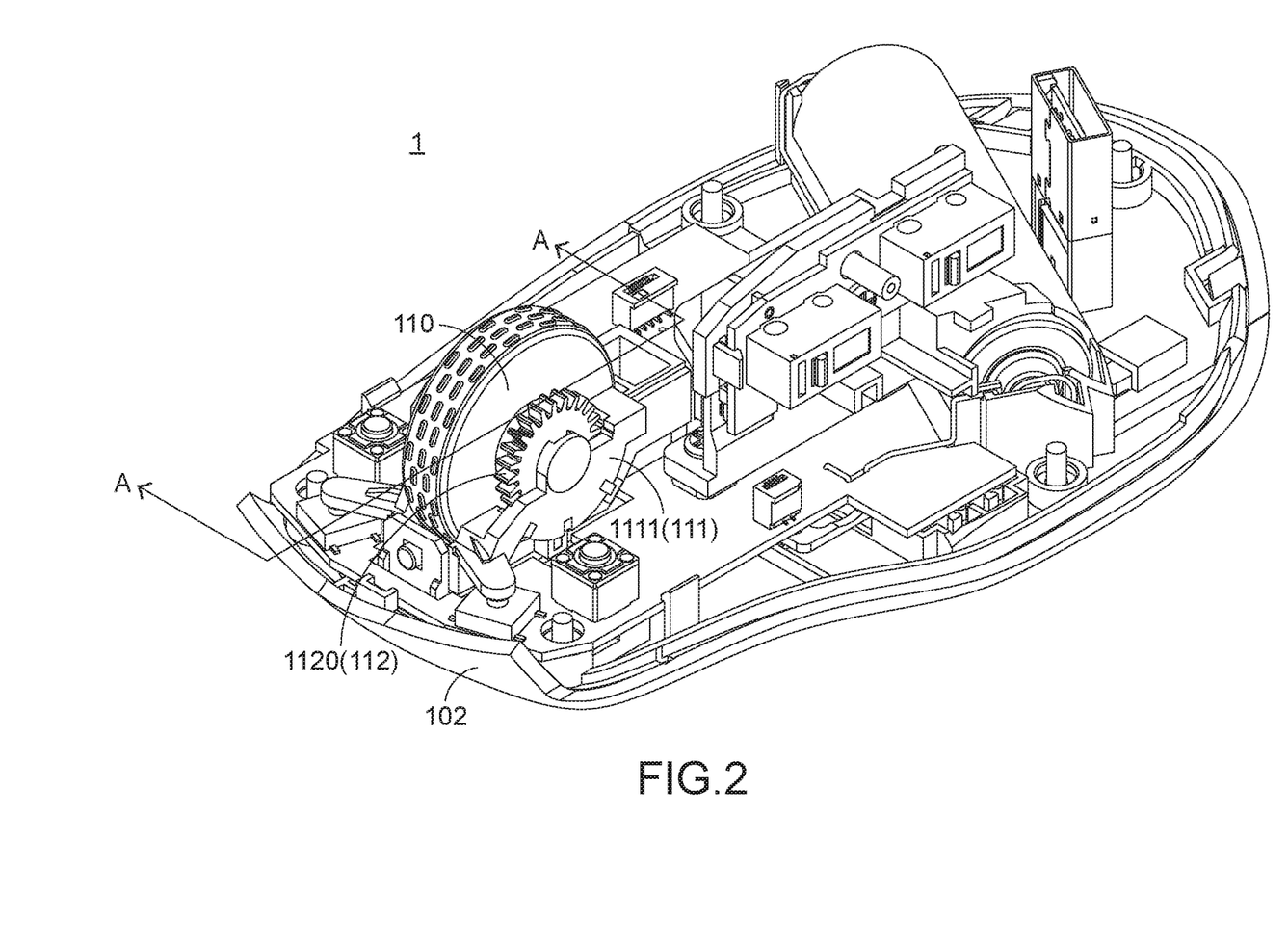
FIG. 2 is a schematic perspective view illustrating a portion of the mouse device as shown in FIG. 1, in which an upper cover of the mouse device is not shown.
Figure 3:
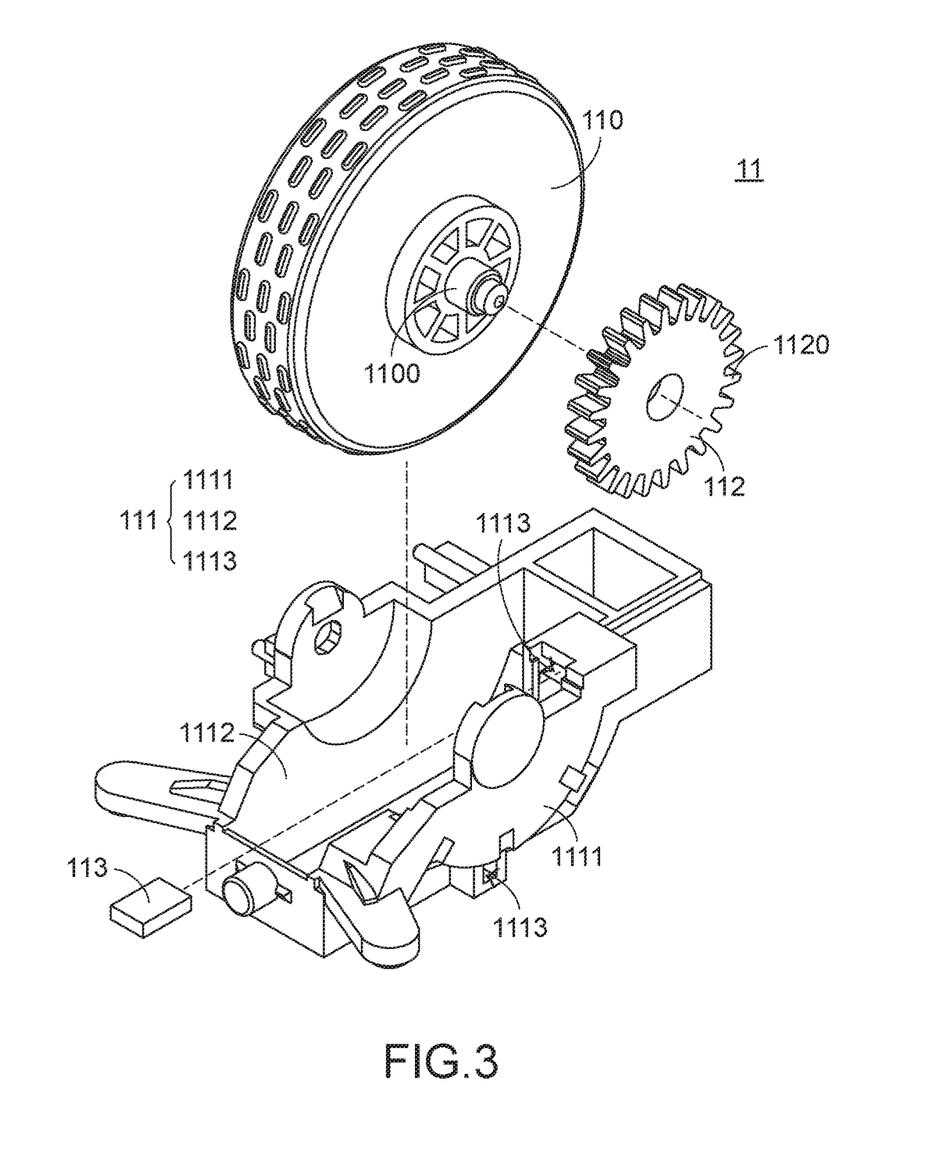
FIG. 3 is a schematic exploded view illustrating the components of a roller module of the mouse device as shown in FIG. 2.
Figure 4:
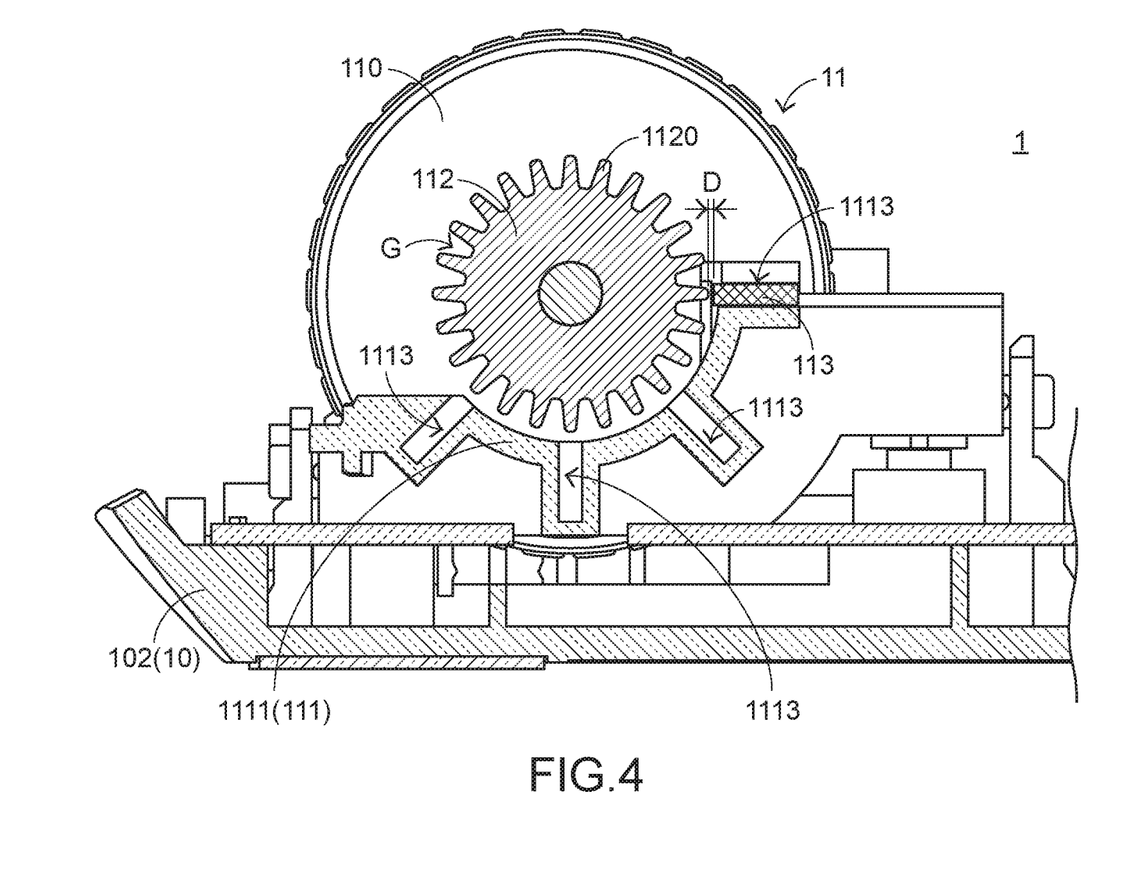
FIG. 4 is a schematic cross-sectional view illustrating the mouse device as shown in FIG. 2 and taken along the line AA.

Please refer to FIGS. 1, 2, 3 and 4. FIG. 1 is a schematic perspective view illustrating the appearance of a mouse device according to a first embodiment of the present invention. FIG. 2 is a schematic perspective view illustrating a portion of the mouse device as shown in FIG. 1, in which an upper cover of the mouse device is not shown. FIG. 3 is a schematic exploded view illustrating the components of a roller module of the mouse device as shown in FIG. 2. FIG. 4 is a schematic cross-sectional view illustrating the mouse device as shown in FIG. 2 and taken along the line AA.

As shown in FIGS. 1, 2, 3 and 4, the mouse device 1 comprises a casing 10 and a roller module 11. The roller module 11 is disposed within the casing 10. In an embodiment, the casing 10 comprises an upper cover 101 and a base member 102. The upper cover 101 and the base member 102 are assembled with each other. An accommodation space is defined between the upper cover 101 and the base member 102 of the casing 10. The roller module 11 is installed on the base member 102 of the casing 10 and disposed within the accommodation space.

A perforation runs through a surface of the casing 10 of the mouse device 1. The perforation is in communication with the accommodation space of the casing 10. A portion of a scroll wheel 110 of the roller module 11 is protruded out of the perforation of the casing 10. Since the scroll wheel 110 is partially exposed outside the casing 10, the scroll wheel 110 can be manipulated by the user. When the mouse device 1 is operated by the user's hand or the mouse device 1 is held and moved, a computing device (not shown) connected with the mouse device 1 is correspondingly controlled. For example, by moving the mouse device 1, a cursor shown on a display screen of the computing device is correspondingly moved. Moreover, by rotating the scroll wheel 110 of the mouse device 1, a vertical scroll bar on a window operation interface of the computing device is moved upwardly or downwardly. The examples and the operating principles of using the mouse device 1 to control the computing device are well known to those skilled in the art, and not redundantly described herein.

Please refer to FIGS. 1, 2, 3 and 4 again. In an embodiment, the roller module 11 comprises the scroll wheel 110, a supporting seat 111, a magnetic ratchet 112 and at least one permanent magnet 113. The supporting seat 111 is used for supporting the scroll wheel 110. The supporting seat 111 comprises a first support part 1111 and a second support part 1112, which are opposed to each other. The scroll wheel 110 is pivotally coupled between the first support part 1111 and the second support part 1112 of the supporting seat 111. Consequently, in response to the user's operation, the scroll wheel 110 is rotatable relative to the supporting seat 111. The magnetic ratchet 112 is arranged between the scroll wheel 110 and the first support part 1111 of the supporting seat 111. The magnetic ratchet 112 comprises plural tooth structures 1120. The plural tooth structures 1120 are discretely arranged on the magnetic ratchet 112. As the scroll wheel 110 is rotated, the magnetic ratchet 112 is correspondingly rotated. That is, when the scroll wheel 110 is rotated, the magnetic ratchet 112 is synchronously rotated with the scroll wheel 110. The at least one permanent magnet 113 is installed on the first support part 1111 of the supporting seat 111. The permanent magnet 113 is aligned with one of the plural tooth structures 1120 of the magnetic ratchet 112. In addition, there is a distance D between the permanent magnet 113 and the corresponding tooth structure 1120.

When the scroll wheel 110 of the roller module 11 is poked by the user, the scroll wheel 110 is correspondingly rotated. As the scroll wheel 110 is rotated, the magnetic ratchet 112 is synchronously rotated with the scroll wheel 110. During the synchronous rotation of the magnetic ratchet 112 and the scroll wheel 110, the plural tooth structures 1120 of the magnetic ratchet 112 are sequentially transferred through the region beside the permanent magnet 113, and a magnetic attractive force between the corresponding tooth structure 1120 and the permanent magnet 113 is generated. Furthermore, a first pole terminal of the permanent magnet 113 is close to the plural tooth structures 1120 of the magnetic ratchet 112, and a second pole terminal of the permanent magnet 113 is away from the plural tooth structures 1120 of the magnetic ratchet 112. In an embodiment, the first pole terminal of the permanent magnet 113 is an N-pole terminal, and the second pole terminal of the permanent magnet 113 is an S-pole terminal. It is noted that the pole types of the first and second pole terminal of the permanent magnet 113 are not restricted.

Preferably but not exclusively, the magnetic ratchet 112 is made of iron metal, cobalt metal or nickel metal. As long as the magnetic attractive force between the magnetic ratchet 112 and the permanent magnet 113 is effectively generated, the magnetic ratchet 112 may be made of any appropriate metallic material with magnetic properties.

Preferably but not exclusively, the distance D between the permanent magnet 113 and each of the plural tooth structures 1120 of the magnetic ratchet 112 is in the range between 0.05 mm and 1.5 mm. While the plural tooth structures 1120 of the magnetic ratchet 112 are sequentially transferred through the region beside the permanent magnet 113, the distance D between the permanent magnet 113 and each of the plural tooth structures 1120 of the magnetic ratchet 112 is maintained in the range between 0.05 mm and 1.5 mm. Consequently, during the rotation of the scroll wheel 110, a stepped motion feel like magnetic levitation (i.e., continuous attraction and release) will be generated.

As mentioned above, the at least one permanent magnet 113 is installed on the first support part 1111 of the supporting seat 111. Consequently, in different operating modes, the distance D between the permanent magnet 113 and each of the plural tooth structures 1120 of the magnetic ratchet 112 can be maintained at a fixed distance. Even after the long-term use of the mouse device 1, the rotation of the scroll wheel 110 provides the consistent stepped motion feel to the user. Furthermore, the roller module 11 may be designed to have a tilt wheel structure. In case that the scroll wheel 110 is tilted and swung in the left side or the right side, the distance D between the permanent magnet 113 and each of the plural tooth structures 1120 of the magnetic ratchet 112 can be still maintained at the fixed distance. Consequently, the rotation of the scroll wheel 110 can still provide the consistent stepped motion feel to the user.

The other structures of the roller module 11 will be described in more details as follows.

Please refer to FIGS. 1, 2, 3 and 4 again. In an embodiment, the scroll wheel 110 further comprises a rotation shaft 1100. The rotation shaft 1100 is protruded from two opposite sides of a central region of the scroll wheel 110. The magnetic ratchet 112 is installed on the rotation shaft 1100 and located beside the scroll wheel 110. In addition, the plural tooth structures 1120 of the magnetic ratchet 112 are arranged around the rotation shaft 1100 of the scroll wheel 110. The scroll wheel 110 is pivotally coupled between the first support part 1111 and the second support part 1112 of the supporting seat 111 through the rotation shaft 1100. Consequently, the scroll wheel 110 is rotatable relative to the supporting seat 111. As the scroll wheel 110 is rotated, the magnetic ratchet 112 is correspondingly rotated.

Please refer to FIGS. 3 and 4 again. In an embodiment, the supporting seat 111 further comprises at least one receiving structure 1113. The at least one receiving structure 1113 is formed in the first support part 1111 of the supporting seat 111 and aligned with the magnetic ratchet 112. In this embodiment, the at least one permanent magnet 113 is disposed within the corresponding receiving structure 1113 of the first support part 1111 of the supporting seat 111. In addition, a portion of each permanent magnet 113 is exposed outside the corresponding receiving structure 1113 and aligned with one of the plural tooth structures 1120 of the magnetic ratchet 112.

Please refer to FIG. 4. In this embodiment, plural receiving structures 1113 are previously formed in the first support part 1111 of the supporting seat 111. For example, four receiving structures 1113 are formed in the first support part 1111 of the supporting seat 111. These receiving structures 1113 are respectively located along different radial directions of the magnetic ratchet 112 and in a radial arrangement. It is noted that the number of the receiving structures 1113 is not restricted. That is, the number of the receiving structures 1113 may be increased or decreased according to the practical requirements.

In an embodiment, the roller module 11 comprises a single permanent magnet 113, and the single permanent magnet 113 is disposed within one of the plural receiving structures 1113. In some other embodiments, the roller module comprises two or more permanent magnets, and these permanent magnets are disposed within the corresponding receiving structures 1113. Consequently, the rotation of the scroll wheel 110 provides clearer and more obvious stepped motion feel to the user. In addition, the magnetic attractive force between the magnetic ratchet 112 and the permanent magnets 113 will be increased.

The operations of the roller module 11 will be described in more details as follows.

As shown in FIGS. 2, 3 and 4, the plural tooth structures 1120 of the magnetic ratchet 112 are discretely arranged on plural tooth structures 1120 are discretely arranged on the magnetic ratchet 112. That is, there is a gap G between every two adjacent tooth structures 1120 of the plural tooth structures 1120. When the scroll wheel 110 of the roller module 11 is poked by the user, the scroll wheel 110 is correspondingly rotated. As the scroll wheel 110 is rotated, the magnetic ratchet 112 is correspondingly rotated. Consequently, the plural tooth structures 1120 of the magnetic ratchet 112 and the gaps G between every two adjacent tooth structures 1120 are sequentially transferred through the region beside the permanent magnet 113. When any of the plural tooth structures 1120 is moved to the region beside the corresponding permanent magnet 113, the magnetic attractive force between this tooth structure 1120 and the permanent magnet 113 is generated. When the gap G between any two adjacent tooth structures 1120 is moved to the region beside the corresponding permanent magnet 113, the magnetic attractive force is attenuated or eliminated. As mentioned above, the plural tooth structures 1120 of the magnetic ratchet 112 and the gaps G between the adjacent tooth structures 1120 are alternately transferred through the region beside the permanent magnet 113. Consequently, during the rotation of the scroll wheel 110, a stepped motion feel like the magnetic levitation (i.e., continuous attraction and release) will be generated. In this way, the function of controlling the page scrolling action of a window operation interface can be achieved.

As mentioned above, a proper distance D between the permanent magnet 113 and each of the plural tooth structures 1120 of the magnetic ratchet 112 is maintained. That is, while the magnetic ratchet 112 is rotated with the scroll wheel 110, the plural tooth structures 1120 of the magnetic ratchet 112 and the permanent magnet 113 are not interfered with each other. Consequently, when the scroll wheel 110 is rotated by the user at a fast speed, the roller module 11 provides the operating feel of fast rotation (e.g., like a hyper-fast scrolling feel) to the user.

Figure 5:
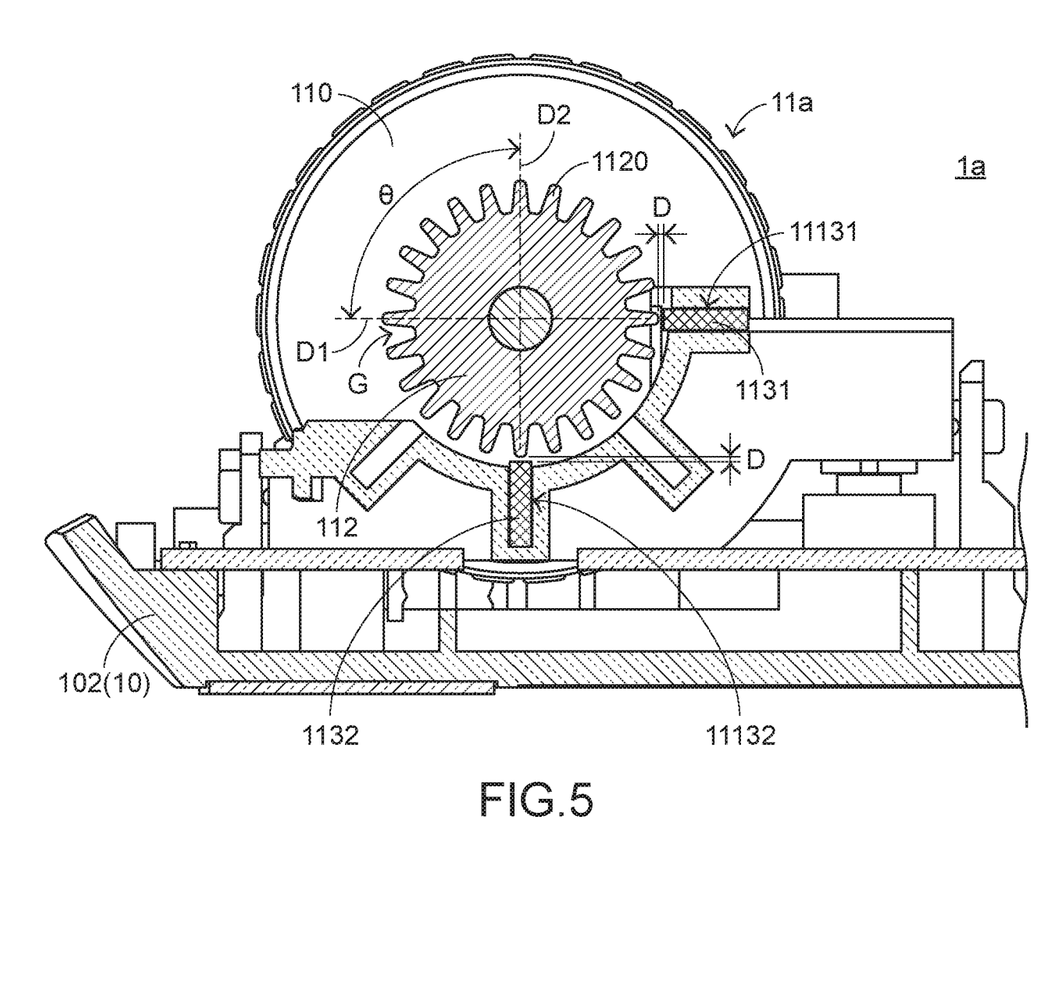
FIG. 5 is a schematic cross-sectional view illustrating a portion of a mouse device according to a second embodiment of the present invention.
Figure 6:
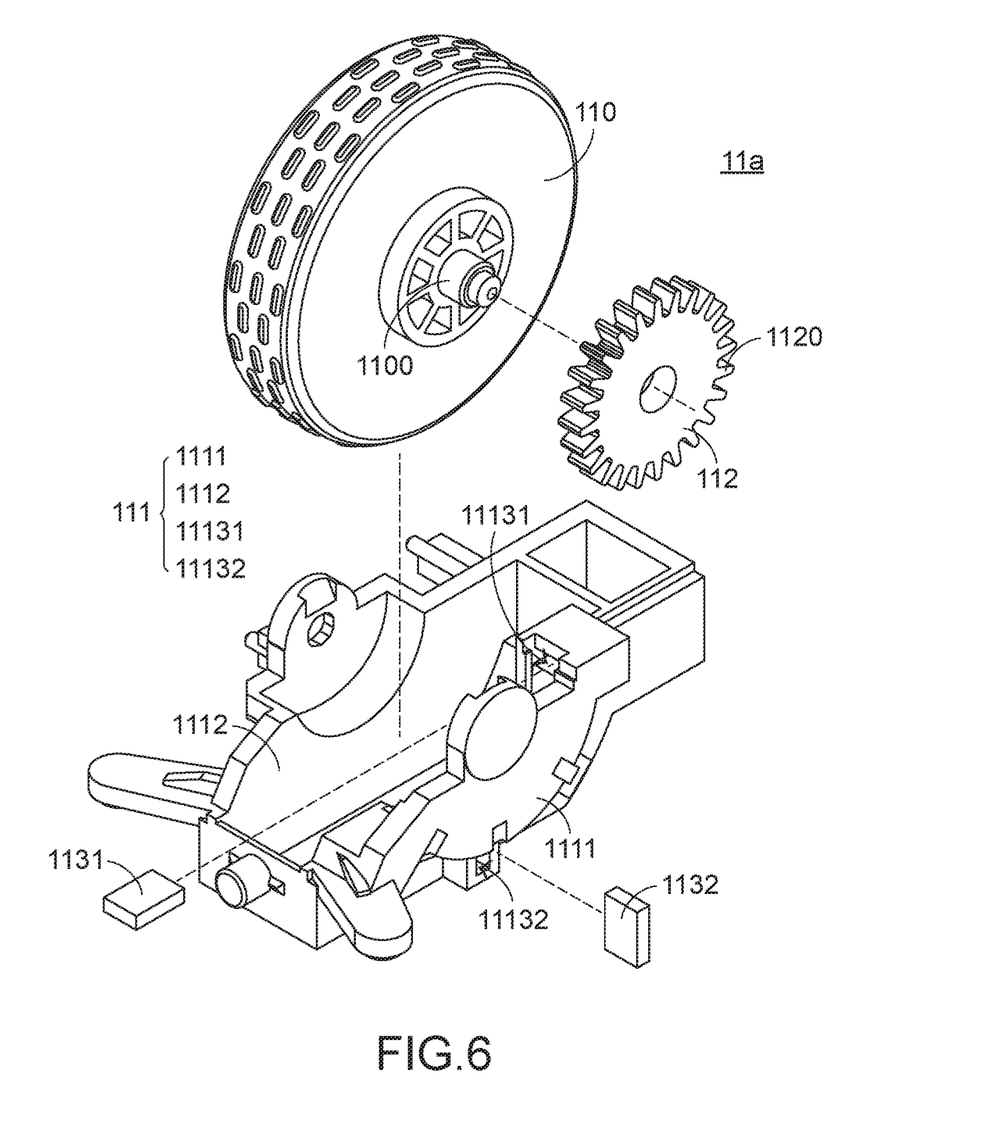
FIG. 6 is a schematic exploded view illustrating the components of a roller module of the mouse device as shown in FIG. 5, in which some components are not shown.

Please refer to FIGS. 5 and 6. FIG. 5 is a schematic cross-sectional view illustrating a portion of a mouse device according to a second embodiment of the present invention, in which some components are not shown. FIG. 6 is a schematic exploded view illustrating the components of a roller module of the mouse device as shown in FIG. 5.

As shown in FIGS. 5 and 6, the components of the mouse device 1a of this embodiment are similar to those of the mouse device 1 as shown in FIGS. 1, 2, 3 and 4. In comparison with the mouse device 1, the roller module 11a in the mouse device 1a of this embodiment comprises two permanent magnets, i.e., a first permanent magnet 1131 and a second permanent magnet 1132. Furthermore, the supporting seat 111 further comprises two receiving structures corresponding to the two permanent magnets. The two receiving structures of the supporting seat 111 includes a first receiving structure 11131 and a second receiving structure 11132.

In this embodiment, the first permanent magnet 1131 is disposed within the first receiving structure 11231, and a portion of the first permanent magnet 1131 is exposed outside the first receiving structure 11231. Similarly, the second permanent magnet 1132 is disposed within the second receiving structure 11232, and a portion of the second permanent magnet 1132 is exposed outside the second receiving structure 11232. In case that the scroll wheel 110 is not rotated (i.e., in a static condition), the first permanent magnet 1131 is aligned with one of the plural tooth structures 1120 of the magnetic ratchet 112, and the second permanent magnet 1132 is aligned with another of the plural tooth structures 1120 of the magnetic ratchet 112.

In this embodiment, the first receiving structure 11231 for accommodating the first permanent magnet 1131 is arranged along a first radial direction D1 of the magnetic ratchet 112, and the second receiving structure 11232 for accommodating the second permanent magnet 1132 is arranged along a second radial direction D2 of the magnetic ratchet 112. There is an included angle θ between the first radial direction D1 and the second radial direction D2. For example, the included angle θ between the first radial direction D1 and the second radial direction D2 is 90 degrees. Due to this structural design, the first permanent magnet 1131 and the second permanent magnet 1132 are evenly distributed around the periphery region of the magnetic ratchet 112. Consequently, the magnetic attractive force between the first permanent magnet 1131 and the magnetic ratchet 112 and the magnetic attractive force between the second permanent magnet 1132 and the magnetic ratchet 112 are generated at the appropriate positions.

It is noted that the included angle θ between the first radial direction D1 and the second radial direction D2 is not restricted to 90 degrees. The included angle θ may be varied according to the practical requirements. For example, in another embodiment, the included angle θ between the first radial direction D1 and the second radial direction D2 is 45 degrees, 128 degrees, 180 degrees or larger than 180 degrees.

In this embodiment, the roller module 11a of the mouse device 1a comprises two permanent magnets. Due to this structural design, the operation of the roller module 11a can provide the stepped motion feel like the magnetic levitation (i.e., continuous attraction and release) to the user. Furthermore, the rotation process of the scroll wheel 110 is more stable and smoother, and the stepped motion feel is clearer and clearer.

In this embodiment, the mouse device comprises two permanent magnets. It is noted that the number of the permanent magnets is not restricted. For example, in some other embodiments, the mouse device comprises more than two permanent magnets according to the practical requirements.

Figure 7:
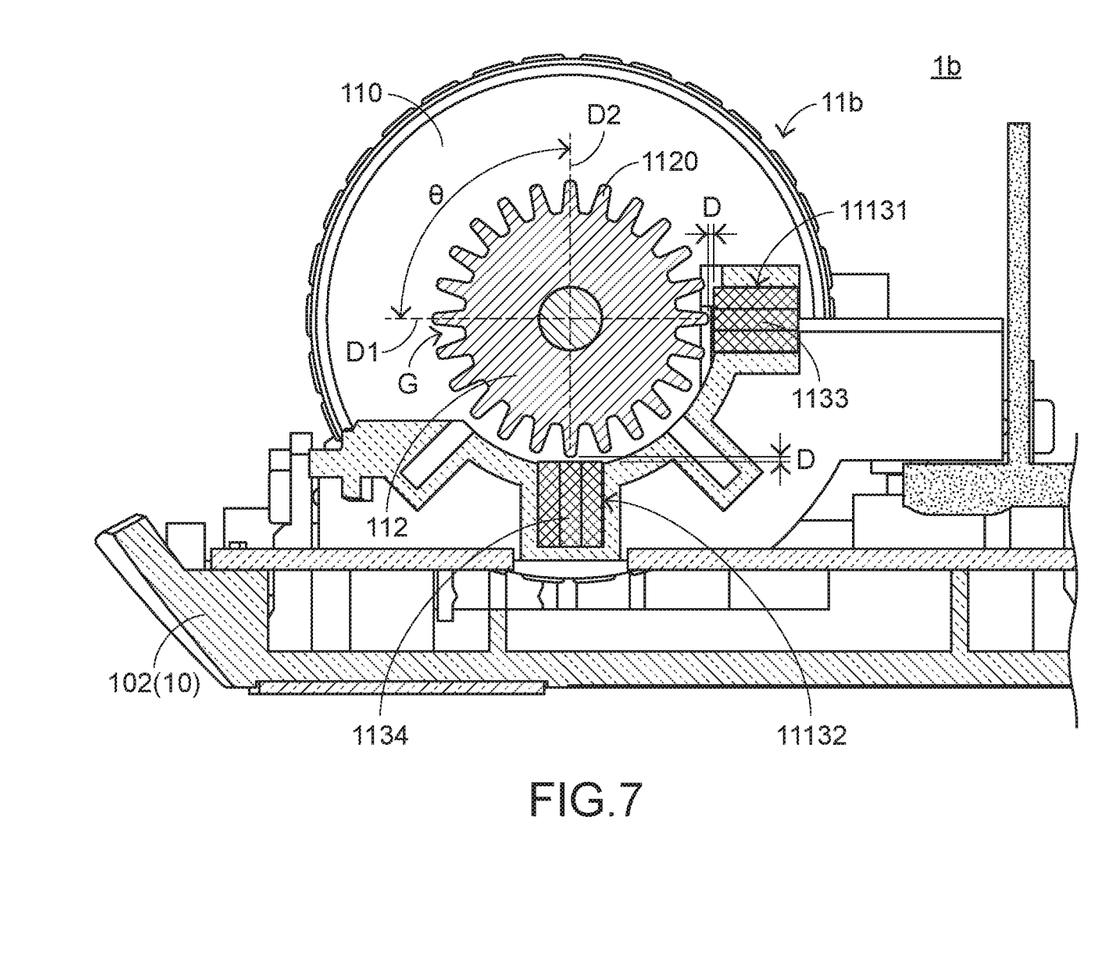
FIG. 7 is a schematic cross-sectional view illustrating a portion of a mouse device according to a third embodiment of the present invention, in which some components are not shown.
Figure 8:
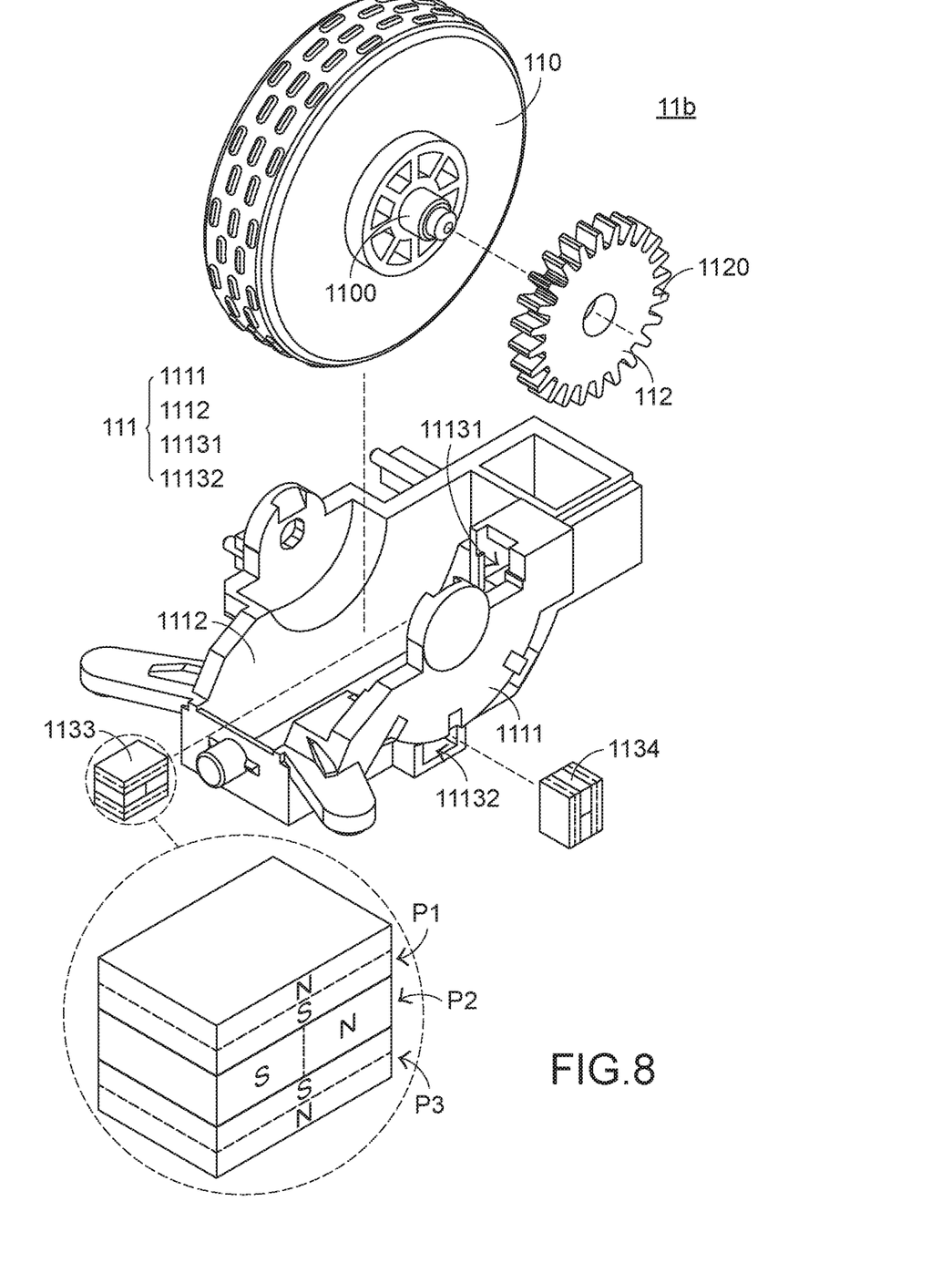
FIG. 8 is a schematic exploded view illustrating the components of a roller module of the mouse device as shown in FIG. 7.

Please refer to FIGS. 7 and 8. FIG. 7 is a schematic cross-sectional view illustrating a portion of a mouse device according to a third embodiment of the present invention, in which some components are not shown. FIG. 8 is a schematic exploded view illustrating the components of a roller module of the mouse device as shown in FIG. 7. In comparison with the mouse device 1a of FIGS. 5 and 6, the roller module 11b of the mouse device 1B in this embodiment comprises more than two permanent magnets.

The permanent magnets in the roller module 11b of the mouse device 1B are divided into first-group permanent magnets and second-group permanent magnets. The first-group permanent magnets are arranged as a first Halbach array 1133. The second-group permanent magnets are arranged as a second Halbach array 1134. In this embodiment, the first Halbach array 1133 is disposed within the first receiving structure 11131, and a portion of the first Halbach array 1133 is exposed outside the first receiving structure 11131. Similarly, the second Halbach array 1134 is disposed within the second receiving structure 11132, and a portion of the second Halbach array 1134 is exposed outside the second receiving structure 11132. In case that the scroll wheel 110 is not rotated (i.e., in a static condition), the first Halbach array 1133 is aligned with one of the plural tooth structures 1120 of the magnetic ratchet 112, and the second Halbach array 1134 is aligned with another of the plural tooth structures 1120 of the magnetic ratchet 112.

In an embodiment, each of the first Halbach array 1133 and the second Halbach array 1134 comprises a first permanent magnet group P1, a second permanent magnet group P2 and a third permanent magnet group P3. The first permanent magnet group P1 is stacked on the top side of the second permanent magnet group P2. The third permanent magnet group P3 is stacked on the bottom side of the second permanent magnet group P2. The second permanent magnet group P2 is arranged between the first permanent magnet group P1 and the third permanent magnet group P3. Furthermore, the arrangement of the magnetic poles of the permanent magnets in each of the first Halbach array 1133 and the second Halbach array 1134 is specially designed. For example, the magnetic poles of the first permanent magnet group P1 are sequentially N and S poles along the longitudinal direction (i.e., the vertical direction), and the S pole of the first permanent magnet group P1 faces the second permanent magnet group P2. In addition, the magnetic poles of the second permanent magnet group P2 are sequentially S and N poles along the transverse direction (i.e., the horizontal direction), and the S pole of the second permanent magnet group P2 is close to the plural tooth structures 1120 of the magnetic ratchet 112. In addition, the magnetic poles of the third permanent magnet group P3 are sequentially S and N poles along the longitudinal direction (i.e., the vertical direction), and the S pole of the third permanent magnet group P3 faces the second permanent magnet group P2.

Since plural permanent magnets are assembled as the Halbach array, the magnetic attractive force between the permanent magnets and the plural tooth structures 1120 of the magnetic ratchet 112 will be increased. It is noted that the arrangement of the magnetic poles of the Halbach array is not restricted. That is, the arrangement of the magnetic poles of the Halbach array may be varied according to the practical requirements.

In this embodiment, the roller module 11*b* of the mouse device 1*b* comprises more than two permanent magnets. Moreover, these permanent magnets are assembled as the first Halbach array 1133 and the second Halbach array 1134. Due to this structural design, the operation of the roller module 11*b* can provide the stepped motion feel like the magnetic levitation (i.e., continuous attraction and release) to the user. Furthermore, the rotation process of the scroll wheel 110 is more stable and smoother, and the stepped motion feel is clearer and clearer.

In the above embodiment, the plural permanent magnets are assembled as two Halbach arrays. It is noted that the number of the Halbach arrays is not restricted. For example, in some other embodiments, the mouse device comprises more than two Halbach arrays according to the practical requirements.

It is noted that numerous modifications and alterations may be made while retaining the teachings of the invention. For example, in a variant example of FIGS. 5 and 6, a single permanent magnet and a Halbach array (e.g., shown in FIGS. 7 and 8) are respectively disposed within two different receiving structures of the supporting seat.

From the above descriptions, the present invention provides the mouse device. In the roller module of the mouse device, one or plural permanent magnets and the cooperate with each other to achieve the purpose of the present invention. As a consequence, the mouse device has both of the function of generating the stepped motion feel upon rotation of the scroll wheel and the function of quickly rotating the scroll wheel. When the scroll wheel of the roller module is rotated by the user, the magnetic ratchet is correspondingly rotated with the scroll wheel. Consequently, the plural spaced tooth structures of the magnetic ratchet are sequentially transferred through the region beside the permanent magnet. When any of the plural tooth structures is moved to the region beside the permanent magnet, the magnetic attractive force between this tooth structure and the permanent magnet is generated. Consequently, during the rotation of the scroll wheel, a stepped motion feel like magnetic levitation (i.e., continuous attraction and release) will be generated. In addition, a proper distance between the permanent magnet and each of the plural tooth structures of the magnetic ratchet is maintained. That is, while the magnetic ratchet is rotated with the scroll wheel, the plural tooth structures of the magnetic ratchet and the permanent magnet are not interfered with each other. Due to this structural design, the roller module provides the operating feel of fast rotation (e.g., like a hyper-fast scrolling feel) when the scroll wheel is rotated at a fast speed. Moreover, the structure design of the roller module in the mouse device of the present invention is simplified. It is not necessary to additionally install a motor to drive and control the rotating speed of the scroll wheel. Consequently, the fabricating cost of the mouse device is largely reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

The invention claimed is:

1. A mouse device, comprising:
    a casing; and
    a roller module disposed within the casing, and comprising:
        a scroll wheel;
        a supporting seat supporting the scroll wheel, wherein the supporting seat comprises a first support part and a second support part, which are opposed to each other, wherein the scroll wheel is pivotally coupled between the first support part and the second support part, so that the scroll wheel is rotatable relative to the supporting seat;
        a magnetic ratchet arranged between the scroll wheel and the first support part of the supporting seat, wherein as the scroll wheel is rotated, the magnetic ratchet is correspondingly rotated, wherein the magnetic ratchet comprises plural tooth structures, and the plural tooth structures are discretely arranged on the magnetic ratchet; and
        at least one permanent magnet installed on the first support part of the supporting seat, and aligned with at least one of the plural tooth structures of the magnetic ratchet, wherein there is a distance between each of the at least one permanent magnet and the corresponding tooth structure of the plural tooth structures, wherein the distance between each of the at least one permanent magnet and the corresponding tooth structure of the plural tooth structures is in a range between 0.05 mm and 1.5 mm, wherein while the magnetic ratchet is rotated with the scroll wheel, a magnetic attractive force between the plural tooth structures and the at least one permanent magnet is generated.

2. The mouse device according to claim 1, wherein the supporting seat further comprises at least one receiving structure, and the at least one receiving structure is formed in first support part of the supporting seat, wherein each of the at least one permanent magnet is disposed within the corresponding receiving structure and partially exposed outside the corresponding receiving structure.

3. The mouse device according to claim 1, wherein the at least one permanent magnet includes plural permanent magnets, and the plural permanent magnets includes a first permanent magnet and a second permanent magnet, wherein the supporting seat further comprises a first receiving structure and a second receiving structure, and the first receiving structure and the second receiving structure are formed in first support part of the supporting seat, wherein the first permanent magnet is disposed within the first receiving structure and partially exposed outside the first receiving structure, the second permanent magnet is disposed within the second receiving structure and partially exposed outside the second receiving structure, the first permanent magnet is aligned with one of the plural tooth structures of the magnetic ratchet, and the second permanent magnet is aligned with another of the plural tooth structures of the magnetic ratchet.

4. The mouse device according to claim 3, wherein the first receiving structure is arranged along a first radial direction of the magnetic ratchet, and the second receiving structure is arranged along a second radial direction of the magnetic ratchet, wherein an included angle between the first radial direction and the second radial direction is in a range between 45 degrees and 180 degrees.

5. The mouse device according to claim 1, wherein the at least one permanent magnet includes plural permanent magnets, and first and second portions of the plural permanent magnets are respectively arranged as a first Halbach array and as a second Halbach array, wherein the supporting seat further comprises a first receiving structure and a second receiving structure, and the first receiving structure and the second receiving structure are formed in first support part of the supporting seat, wherein the first Halbach array is disposed within the first receiving structure and partially exposed outside the first receiving structure, the second Halbach array is disposed within the second receiving structure and partially exposed outside the second receiving structure, the first Halbach array is aligned with one of the plural tooth structures of the magnetic ratchet, and the second Halbach array is aligned with another of the plural tooth structures of the magnetic ratchet.

6. The mouse device according to claim 1, wherein the at least one permanent magnet includes plural permanent magnets, and the supporting seat further comprises a plural receiving structures, wherein the plural receiving structures are formed in first support part of the supporting seat, the plural permanent magnets are respectively disposed within the corresponding receiving structures, and the plural receiving structures are respectively located along different radial directions of the magnetic ratchet and in a radial arrangement.

7. The mouse device according to claim 1, wherein the casing comprises an upper cover and a base member, and the upper cover and the base member are assembled with each other, wherein an accommodation space is defined between the upper cover and the base member, and the roller module is installed on the base member of the casing and disposed within the accommodation space.

8. The mouse device according to claim 1, wherein the scroll wheel further comprises a rotation shaft, the magnetic ratchet is installed on the rotation shaft, and the plural tooth structures of the magnetic ratchet are arranged around the rotation shaft, wherein the scroll wheel is pivotally coupled between the first support part and the second support part of the supporting seat through the rotation shaft, so that the scroll wheel is rotatable relative to the supporting seat and the magnetic ratchet is rotated with the scroll wheel.

9. The mouse device according to claim 1, wherein the magnetic ratchet is made of iron, cobalt, nickel or a metallic material with magnetic properties.

10. A mouse device, comprising:
a casing; and
a roller module disposed within the casing, and comprising:
  a scroll wheel;
  a supporting seat supporting the scroll wheel, wherein the supporting seat comprises a first support part and a second support part, which are opposed to each other, wherein the scroll wheel is pivotally coupled between the first support part and the second support part, so that the scroll wheel is rotatable relative to the supporting seat;
  a magnetic ratchet arranged between the scroll wheel and the first support part of the supporting seat, wherein as the scroll wheel is rotated, the magnetic ratchet is correspondingly rotated, wherein the magnetic ratchet comprises plural tooth structures, and the plural tooth structures are discretely arranged on the magnetic ratchet; and
  at least one permanent magnet installed on the first support part of the supporting seat, and aligned with at least one of the plural tooth structures of the magnetic ratchet, wherein there is a distance between each of the at least one permanent magnet and the corresponding tooth structure of the plural tooth structures,
  wherein while the magnetic ratchet is rotated with the scroll wheel, a magnetic attractive force between the plural tooth structures and the at least one permanent magnet is generated,
  wherein the supporting seat further comprises at least one receiving structure, and the at least one receiving structure is formed in first support part of the supporting seat, wherein each of the at least one permanent magnet is disposed within the corresponding receiving structure and partially exposed outside the corresponding receiving structure.

11. The mouse device according to claim 10, wherein the at least one permanent magnet includes plural permanent magnets, and the plural permanent magnets includes a first permanent magnet and a second permanent magnet, wherein the supporting seat further comprises a first receiving structure and a second receiving structure, and the first receiving structure and the second receiving structure are formed in first support part of the supporting seat, wherein the first permanent magnet is disposed within the first receiving structure and partially exposed outside the first receiving structure, the second permanent magnet is disposed within the second receiving structure and partially exposed outside the second receiving structure, the first permanent magnet is aligned with one of the plural tooth structures of the magnetic ratchet, and the second permanent magnet is aligned with another of the plural tooth structures of the magnetic ratchet.

12. The mouse device according to claim 11, wherein the first receiving structure is arranged along a first radial direction of the magnetic ratchet, and the second receiving structure is arranged along a second radial direction of the magnetic ratchet, wherein an included angle between the first radial direction and the second radial direction is in a range between 45 degrees and 180 degrees.

13. The mouse device according to claim 10, wherein the at least one permanent magnet includes plural permanent magnets, and first and second portions of the plural permanent magnets are respectively arranged as a first Halbach array and as a second Halbach array, wherein the supporting seat further comprises a first receiving structure and a second receiving structure, and the first receiving structure and the second receiving structure are formed in first support part of the supporting seat, wherein the first Halbach array is disposed within the first receiving structure and partially exposed outside the first receiving structure, the second Halbach array is disposed within the second receiving structure and partially exposed outside the second receiving structure, the first Halbach array is aligned with one of the plural tooth structures of the magnetic ratchet, and the second Halbach array is aligned with another of the plural tooth structures of the magnetic ratchet.

14. The mouse device according to claim 10, wherein the at least one permanent magnet includes plural permanent magnets, and the supporting seat further comprises a plural receiving structures, wherein the plural receiving structures are formed in first support part of the supporting seat, the plural permanent magnets are respectively disposed within the corresponding receiving structures, and the plural receiving structures are respectively located along different radial directions of the magnetic ratchet and in a radial arrangement.

15. The mouse device according to claim 10, wherein the casing comprises an upper cover and a base member, and the upper cover and the base member are assembled with each other, wherein an accommodation space is defined between the upper cover and the base member, and the roller module is installed on the base member of the casing and disposed within the accommodation space.

16. The mouse device according to claim 10, wherein the scroll wheel further comprises a rotation shaft, the magnetic ratchet is installed on the rotation shaft, and the plural tooth structures of the magnetic ratchet are arranged around the rotation shaft, wherein the scroll wheel is pivotally coupled between the first support part and the second support part of the supporting seat through the rotation shaft, so that the scroll wheel is rotatable relative to the supporting seat and the magnetic ratchet is rotated with the scroll wheel.

17. The mouse device according to claim 10, wherein the magnetic ratchet is made of iron, cobalt, nickel or a metallic material with magnetic properties.

* * * * *